United States Patent [19]
Hunt et al.

[11] Patent Number: 5,982,427
[45] Date of Patent: Nov. 9, 1999

[54] DIGITAL IMAGE PROCESSING

[75] Inventors: Stuart William Arundell Hunt, Hertford; Johnathan Philip Hills, Saffron Walden, both of United Kingdom

[73] Assignee: Innovation TK Ltd., Hertfordshire, United Kingdom

[21] Appl. No.: 08/599,892

[22] Filed: Feb. 12, 1996

[30] Foreign Application Priority Data

Feb. 10, 1995 [GB] United Kingdom ............... 9502717

[51] Int. Cl.$^6$ .................................................. H04N 5/202
[52] U.S. Cl. .......................... 348/254; 348/97; 348/674
[58] Field of Search ........................... 348/97, 674, 613, 348/607, 96, 106, 105, 675–677, 254–256; H04N 3/36, 5/202

[56] References Cited

U.S. PATENT DOCUMENTS

| | | | |
|---|---|---|---|
| 4,963,963 | 10/1990 | Dorman | 358/113 |
| 5,196,924 | 3/1993 | Lumelsky et al. | 348/674 |
| 5,280,353 | 1/1994 | Baldwin | 348/674 |
| 5,337,154 | 8/1994 | Dorricott et al. | 348/97 |
| 5,469,209 | 11/1995 | Gunday et al. | 348/97 |

OTHER PUBLICATIONS

Search Report mailed May 3, 1996.

*Primary Examiner*—Michael H. Lee
*Attorney, Agent, or Firm*—McDonnell Boehnen Hulbert & Berghoff

[57] ABSTRACT

A process for the adjustment of signals obtained from an image, in which analogue signals representative of the image are pre-emphasized and converted to digital signals. The digital signals are then de-emphasized and simultaneously or subsequently adjusted.

22 Claims, 9 Drawing Sheets

FIG.9

DIGITAL IMAGE PROCESSING

INTRODUCTION

This invention relates to the transferring of cinematographic film into electrical signals to be used in such fields as television broadcast or the production of video recordings, but is not limited to either.

BACKGROUND

Film is the most common originating material for television programmes. There has to be therefore a method of sequentially scanning frames of film to convert them into electrical signals for broadcast. Specialist machines, referred to as telecine machines exist for this purpose. Such machines have been in existence since the 1920's. Current examples of such machines include the "URSA" machine, made by Rank Cintel Ltd., Ware, England, and the FDL-90 Machine, manufactured by Broadcast Technology Systems (BTS) of Germany.

It is well known that when film is exposed to light and processed, the light causes a change in the density of the film. The characteristic relationship between the density of the film and the light required to produce that density is referred to as the "Gamma Curve". Essentially, it is found that this characteristic, when plotted on natural logarithmic axes of exposure versus density has a substantially linear portion. The gradient of this linear region is actually referred to as the "Gamma value". This is described well by standard texts in the subject, such as "The Reproduction of Colour in Photography, Printing and Television", By Dr. R. W. G. Hunt (Fountain Press, ISBN 085242356).

It is also well known that when a television monitor, or cathode ray tube, is used as a viewing device, there is a similar characteristic with the electrical voltage used to drive the device and the light emerging from the face of the cathode ray tube. This characteristic is also linear in a 'Log-Log' space. The typical value of gamma for a television monitor is approximately 2.5.

Figure 1:
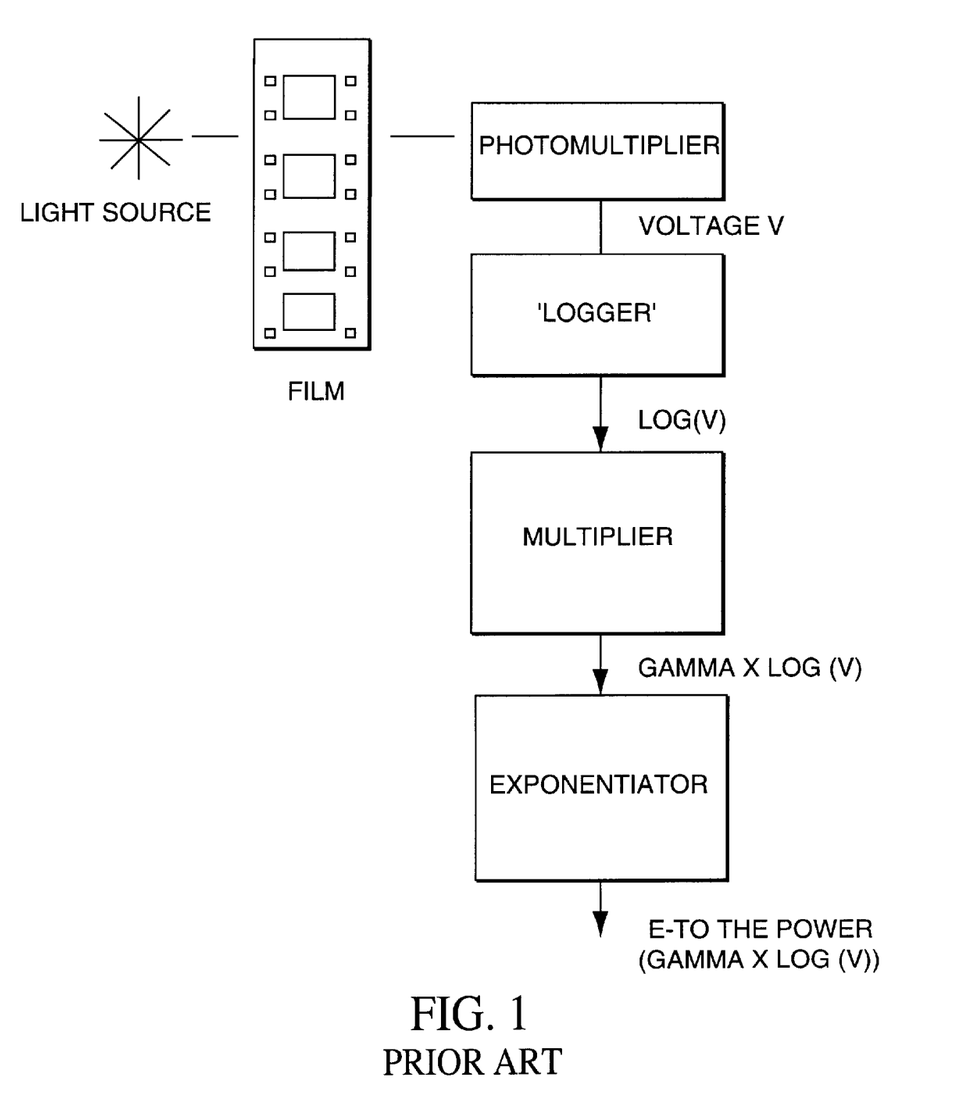
FIG. 1 is a schematic representation of a known analogue gamma adjustment system as used, for example, in the Rank Cintel Mk III telecine.

Thus, where a cathode ray tube is used as the illuminant for a telecine scanning system, if this light source is modulated, this device has a first gamma relationship, whilst the film to be scanned also has a gamma relationship, the detector to collect and measure the light may have a gamma characteristic, and finally the television monitor that the operator is using to view the image will also have a fourth relationship. In practice the CRT light source would probably be "fully on" and thus the gamma characteristics of this device may not be relevant. In any event, in the process of scanning film for television there are up to four separate gamma characteristics that need to be corrected for, apart from the change of characteristic necessary to artistically "lighten" or "darken" material. Various arrangements have been proposed for the alteration of the overall gamma relationship of viewed images. One such technique was used successfully by Rank Cintel in its Mk III telecine, of which over 1000 units have been sold. This is illustrated in FIG. 1. This technique involves an electrical circuit with a "logging" characteristic, followed by a second circuit with a "multiplication" function, with variable operand, followed finally by a third circuit of exponential characteristic. Because of the age of the Mk III telecine all of the above is implemented in analogue electronics, which is widely known to be prone to electrical drift, noise, and "hum". The "drift", caused by amongst other things the slow changing of electrical characteristic over time has to be counteracted by frequent realignment of the electrical circuitry by skilled personnel. Whilst various measures can be taken to reduce the impact of noise, analogue electrical circuitry will always suffer from this problem.

Film is available in two main forms. The first of these is positive film, which corresponds to slide or transparency film in laymen's language. This is characterised by a dark portion of the film corresponding to a dark portion of the original scene. The second form is negative film, which corresponds to the film used domestically to produce photographic prints. This type is characterised by the light portions of the film corresponding to the dark portions of the original scene. It is expected that both types of film can be transferred on a telecine machine. The discussion below will be solely in terms of positive film, although all of the principles involved work equally as well with negative.

Figure 2:
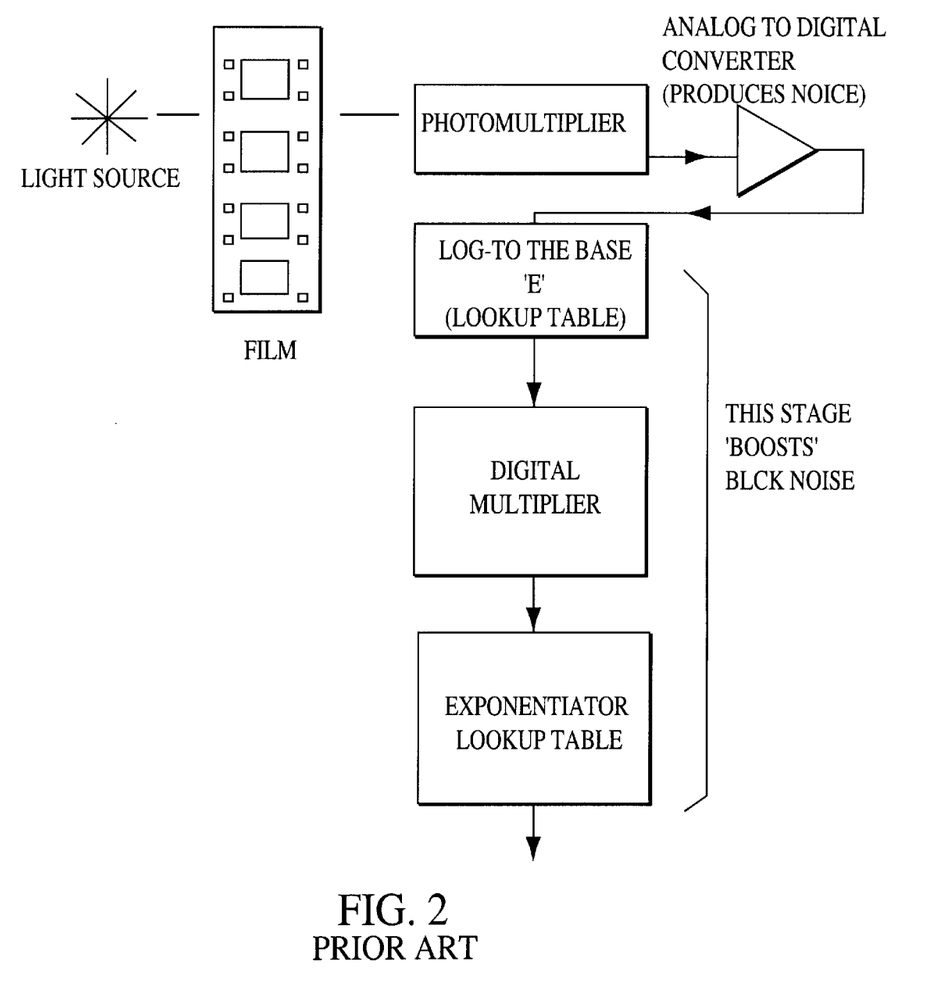
FIG. 2 is a schematic representation of a known digital gamma adjustment system as used, for example, in the Rank Cintel URSA telecine.

Advances in digital electronic circuitry made it possible by the late 1980's to build an almost entirely digital telecine system. One such machine is the Rank Cintel URSA, launched in 1989. The function of this machine is shown in FIG. 2. After the light is received by an electrical photomultiplier tube, the resulting electrical signal is digitised through a high precision analogue to digital (A/D) converter device. This signal is then passed through a digital look-up table (LUT), which has been preloaded with a logarithmic characteristic. After this table, a digital multiplier chip can be used to perform the gamma adjustment, where the operand can be user-selected to effect the gamma change required by the operator. This is finally followed by another look-up table to exponentiate the multiplied signal.

Figure 4A:
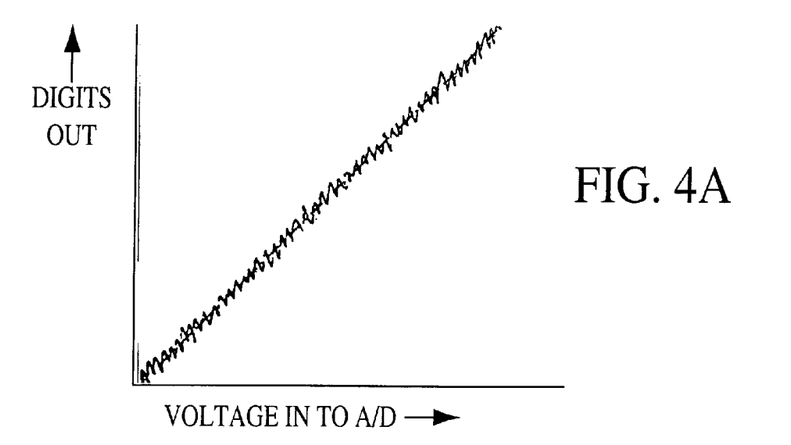
FIGS. 4A to 4C show schematically the increase in noise at dark levels associated with gamma adjustment.
Figure 4B:
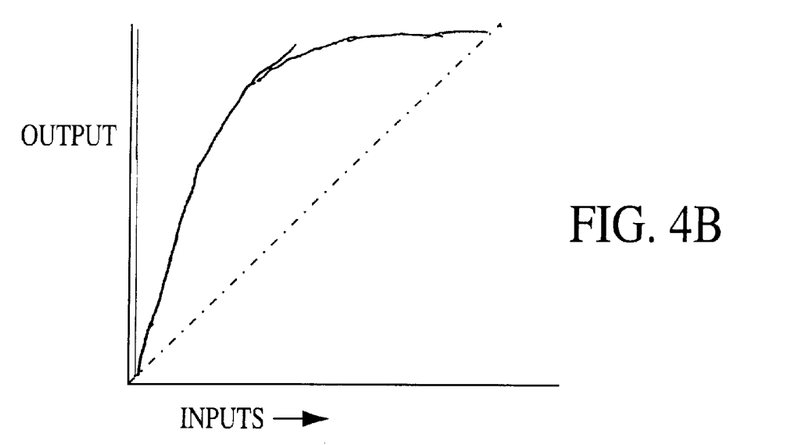
Figure 4C:
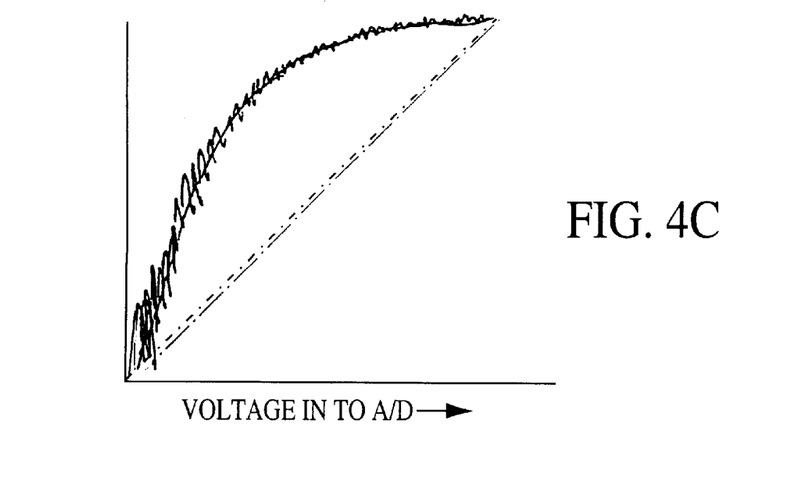

Whilst this circuitry, being digital, does not suffer from the disadvantages of drift, it is known and observed that it inherently produces visible noise in the darker portions of the picture. This is because the analog to digital converter chips inherently produce noise, as shown in FIG. 4A. The speed requirement for these chips, being typically 18 MHz or higher, together with the precision of quantisation required means that even the best available chips show a fairly even noise characteristic throughout their range. By this, it is meant that the amount of noise produced by these chips is not significantly different at high or low parts of the electrical signal level. The desired overall effect of the gamma change is to produce an increase in the differential (or contrast) of the shadow tones; a typical gamma curve is shown in FIG. 4B. This has the undesirable effect of enhancing the visibility of the noise and quantisation problems in these shadow tones as shown in FIG. 4C.

One method of reducing this effect would be to utilise lower noise analog to digital converters. This is not possible at the moment, as the best available chips are already utilised.

SUMMARY OF THE INVENTION

Thus, in accordance with the present invention, there is provided a process for applying characteristic adjustment to signals obtained from an image comprising the steps of:
  producing an analogue signal representative of the image;
  applying to the analogue signal a pre-emphasis;
  converting the analogue signal to a digital signal;
  subjecting the digital signal to a de-emphasis, to remove the effect of the pre-emphasis; and
  simultaneously or subsequently, providing the digital signal with a desired characteristic adjustment.

The process according to the invention has the advantage that noise is only introduced into the signal at the analogue to digital conversion stage, once the signal has been preemphasised. Thus when the signal is de-emphasised, the noise is also de-emphasised. This de-emphasis reduces the relative proportion of A/D convertor noise in the final signal when compared to known systems.

A pre-emphasis may be added to the analogue signal by any suitable mathematical transformation. However, in a preferred embodiment the analogue signal is transformed into a logarithmic domain, of any base, multiplied by a gamma value and then exponentiated. Such a transformation will boost the signal components corresponding to the dark regions of the image which exhibit particularly visible noise in known systems. The gamma value of the pre-emphasis may be variable as in known systems but it is preferred to use a fixed gamma value so that this stage is less subject to drift than a variable-gamma pre-emphasis.

The characteristic adjustment of the digital signal may form a separate stage of the process which takes place after de-emphasis. However, the de-emphasis transformation and the adjustment transformation may be convolved into a single LUT. Other transformations, for example colour or shading correction, ay be included as additional steps in the process to act on the digital signal in either the linear or logarithmic domain.

In a preferred embodiment of the invention a feedback loop is provided between the pre-emphasis and de-emphasis stages to calibrate the exact correspondence of these transformations. Calibration may be effected with reference to a test frame image, of known grey levels, by comparing the digital signal produced to a known equivalent signal. Optical filters may be used, alternatively, to produce a known grey or colour level. Thus, if a variation in the digital signal from the known level occurs, feedback signals can be used to re-calibrate the pre-de-emphasis either by using signals from the pre-emphasis stage to adjust the de-emphasis stage or vice versa. In a preferred embodiment of the invention a calibration light source, for example an LED, of known light level is provided to calibrate the pre-/de-emphasis. The light source may operate at several light levels, for example by pulsing, or an array of such light sources of different levels, for example optically filtered sources, may be provided. Advantageously, the reference light source(s) may be arranged to shine through the perforations in the film.

As an improvement of the calibration, a separate A/D convertor of particularly high linearity or accuracy, for example operating at a slower rate than the main ADC, may be provided to convert the calibration signals with less resultant noise.

Calibration may also be effected by applying reference voltages directly into the pre-emphasis stage or further along the process. Such reference voltages would correspond to a particular light level and may then be used to calibrate the transformation characteristics of the process.

BRIEF DESCRIPTION OF THE DRAWINGS

Some embodiments of the invention will now be described by way of example and with reference to the accompanying Figures in which.

DETAILED DESCRIPTION OF EMBODIMENTS

Figure 3:
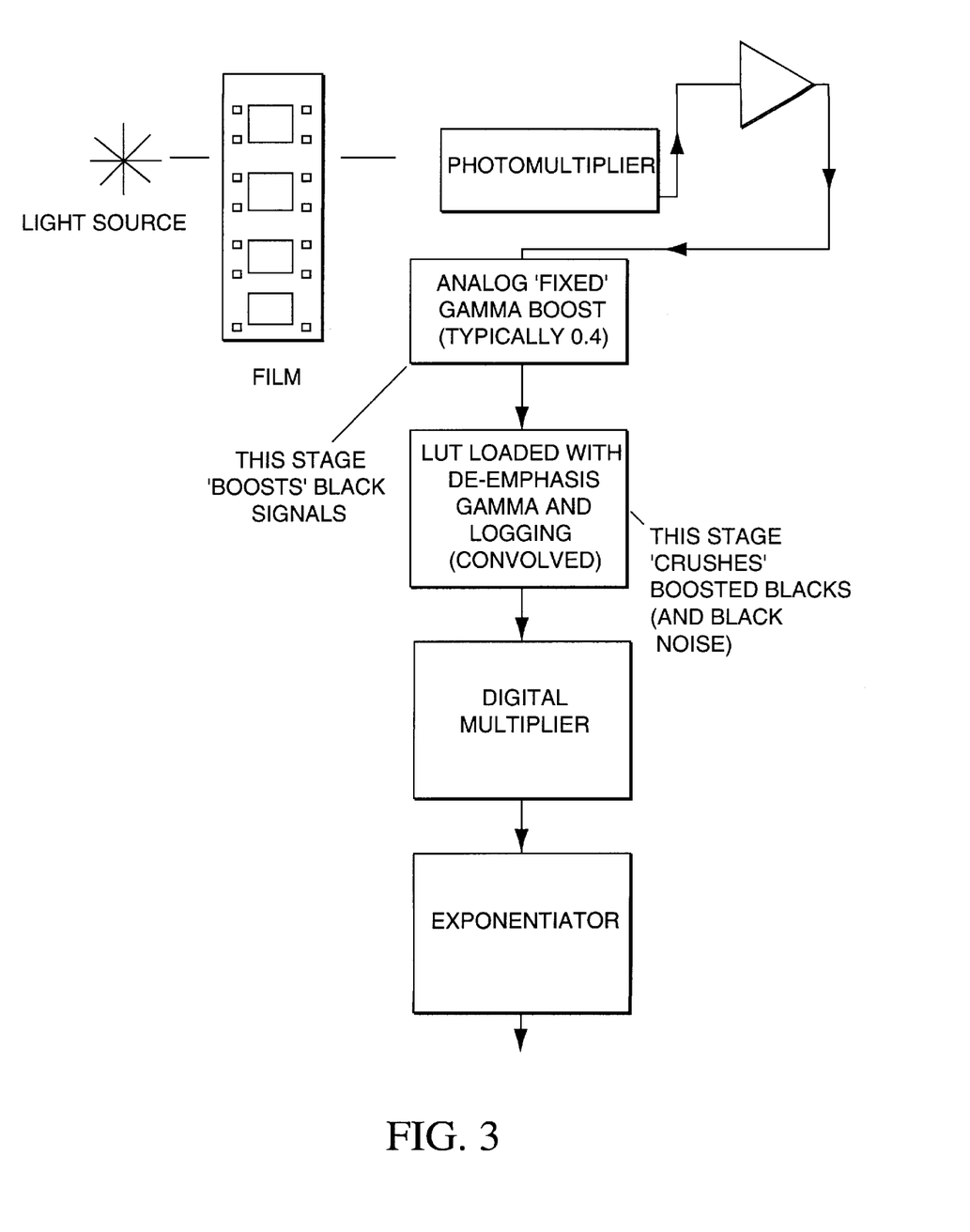
FIG. 3 is a schematic representation of an embodiment of the invention.

In FIG. 3 there is shown, in accordance with an embodiment of the invention, the addition to the previously known architecture of an analogue gamma stage, between the photomultiplier tube and the analogue to digital converter. Such an analogue gamma stage is designed to have a 'fixed' value of gamma, thus making it easier and cheaper to design, and less likely to 'drift' than the adjustable analogue gamma stages utilised in the previously described circuitry, as used in, for example, the Rank Cintel Mk III telecine. This 'fixed' value analogue gamma stage will have a typical gamma of 0.4 (for positive film). This will have the effect of boosting the contrast in darker tones considerably. There is then utilised the same analogue to digital converter as in prior art systems. Noise (as in the prior art) is then added unwantedly by this converter in all regions of its dynamic range. After the analogue to digital converter, there is utilised the same LUT hardware as shown in FIG. 2, but 'downloaded' with a typical gamma characteristic of 2.5, the reciprocal of the pre-emphasis gamma value. This will 'crush' the shadow (or darker tones) of the scene, together with the noise in these tones. The 'normal' multiplying in this logarithmic domain takes place, so that the operator can render the picture as desired.

Because the multiplication can generate signals bigger than the number of bits for the next processing stage, an error propagation technique is utilised. Such techniques are disclosed in "Digital Image Processing", by W. K. Pratt, published by John Wiley & Sons Inc, ISBN 0-471-01888-0, and the publication "Image Coding" by A. G. Teacher, Published by SPIE (The Society of PhotoOptical Instrumentation Engineers, PO Box 10, Bellingham, Wash. 98227, USA) and dated Aug. 16, 1987.

There are clearly many variations on the construction of analogue and digital circuitry to carry out the process according to the invention, which will be apparent to those skilled in the art. Such widely known examples include the convolution of subsequent look-up table values. This involves the loading of one look-up table with the combined value of two cascaded processes. One example of this technique is to convolve together the stages of colour correction, quite often carried out in the latter stages of the telecine signal processing, together with the final exponentiation stage.

Yet another variation that would be apparent is the use of other pre-emphasis and de-emphasis functions other than natural logarithm and exponentiation as in gamma adjustment. Other mathematical functions which perform substantially the same function are known.

Such techniques as described above can apply equally well to telecine systems that utilise either cathode ray tubes (CRT's) or telecines based around charged coupled device (CCD'S). Yet another technique may be to use logarithms of a different base. Whilst it is usual to use natural logarithms, any other base could be used, including base 10.

The techniques are also equally applicable to film scanning systems with light sources such as lasers or other illumination sources as tungsten, quartz iodine or other incandescent or discharge sources. They are also equally applicable should the light collecting and detecting components be either camera tubes, avalanche photo diodes or any other light sensing devices.

These techniques also apply to the class of devices that produce a logarithmic characteristic of voltage relative to a linear characteristic of light input. Such devices include photodiodes operated in the open circuit mode, as opposed to the current mode.

Such a technique as described is particularly of relevance to High Definition Systems (commonly known as HD-TV). Such systems have typically more than one thousand lines of picture, and to receive the full benefit of the enhanced definition are usually viewed on bigger television monitors. The enhanced definition and larger TV monitors will make the problem more visible than in standard definition, making this proposed invention of even greater importance. Another reason why this invention has particular relevance to High Definition is because of the 'strain' to be put on the analog to digital converters. Standard definition requires a data rate of conversion of typically 18 Mhz. High Definition requires conversion at typically 72 Mhz. It is likely that converters working at this data rate would produce even more noise than those working at 18 Mhz. Thus there would be more noise to be boosted in the dark tones. Such improvements as described above would be of benefit in either High Definition real time (i.e 25 or 30 frames per second) or non-real time (i.e. anything slower than 25 or 30 frames per second)

Such techniques could be applied to scanning systems working at so called 'digital film' resolutions. Such systems scan film at a resolution of up to 6000 lines, usually in non-real time. One such system is the 'CINEON' system from Kodak, USA.

Figure 5:
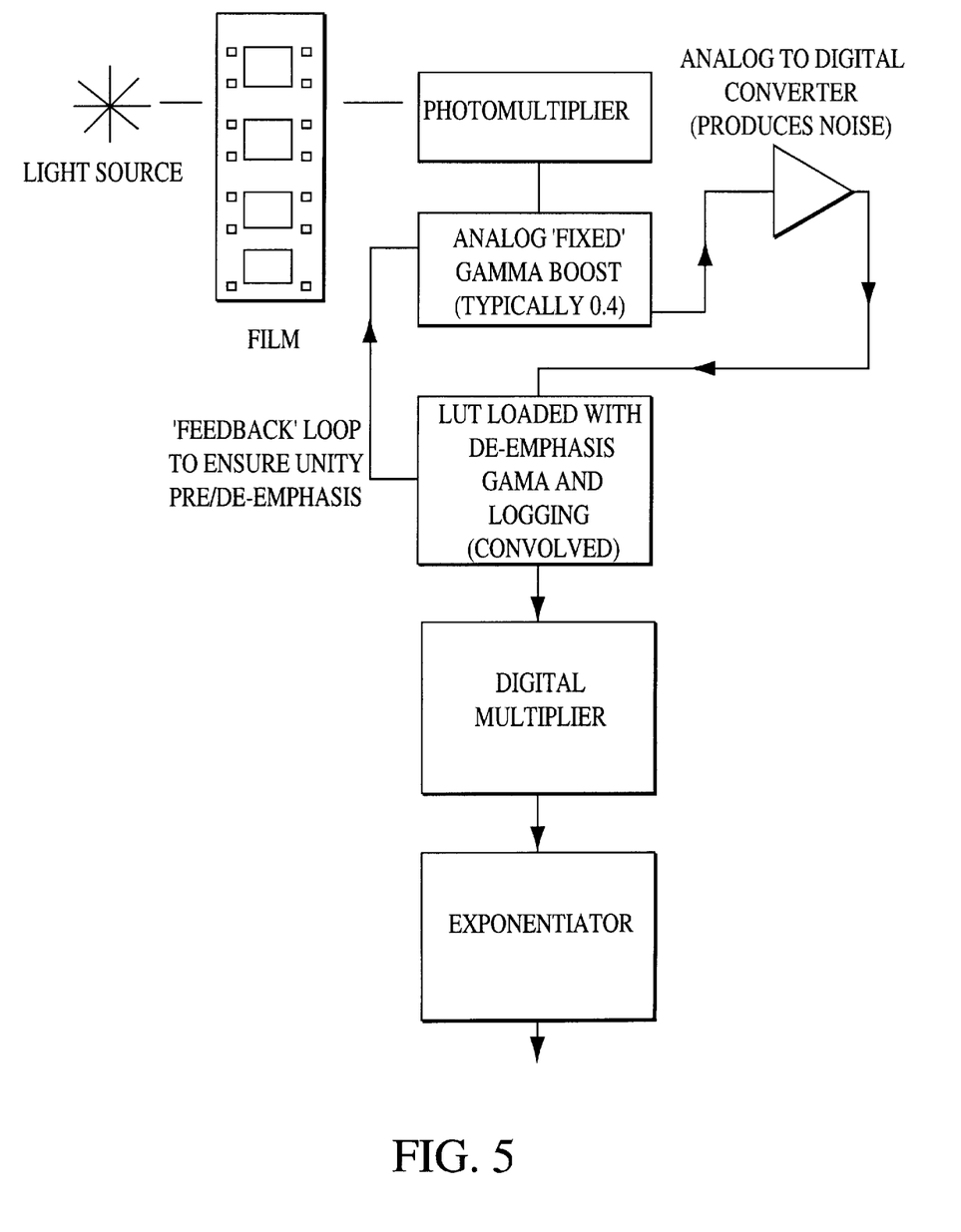
FIG. 5 is a schematic representation of a further embodiment of the invention including a calibration feedback loop.

A further enhancement of the system, as shown in the embodiment of FIG. 5, to remove the possible disadvantage caused by introducing a stage of analogue signal processing is a feedback system, to ensure that any drift in this stage is calibrated out in the characteristic which has been put into the LUT stage after the analogue to digital conversion. Methods of calibration include the regular examination of a test light level to be submitted to the photomultipliers. This can be obtained by either loading onto the telecine machine a test frame, with several levels of grey, and the subsequent analysis of the digital signal as compared with predetermined stored values for those known grey values. Any differences between those stored values and the actual correction values can be used to produce a correction signal to modify the de-emphasis signal in the LUT. Other implementations of this include the use of optical filters to be inserted into the light path either manually or automatically, as opposed to using a film based image. Another variation of this feedback circuitry is to utilise signals from the digital LUT to influence or adjust the analogue processing stage.

Other implementations are possible for this feedback technique. One such other technique is to have a reference light source, such as an LED (light emitting diode) which emits a reference light level. This can be used for calibrating the combined analogue pre-emphasis and digital de-emphasis to have constant cover-all transfer. Further improvement to this could be either to pulse the single LED at various light levels to calibrate the overall unity transfer at several points in the range, or to have an array of LED's with different optical filters over them, to accomplish substantially the same effect. Such light, either with single or multiple LED's could be shone through the film perforation holes.

As a further improvement, such light could be collected through a separate detector and analogue to digital converter. Such a detector could be a high linearity or high accuracy device, and the separate analog to digital converter could be clocked at a rate much slower than the picture digitising A/D's. These slower devices generally produce much less noise than the fast 'picture-digitising' types, thus improving the accuracy and quality of the feedback loop.

Such a calibration technique could also be effected by 'injecting' a series of reference voltages which could be thought of as the electrical equivalents of a film or optical 'grey scale' at any stage after the light detector. This could be used to calibrate the pre-emphasis/de-emphasis for gain and/or the required transfer function.

Figure 6:
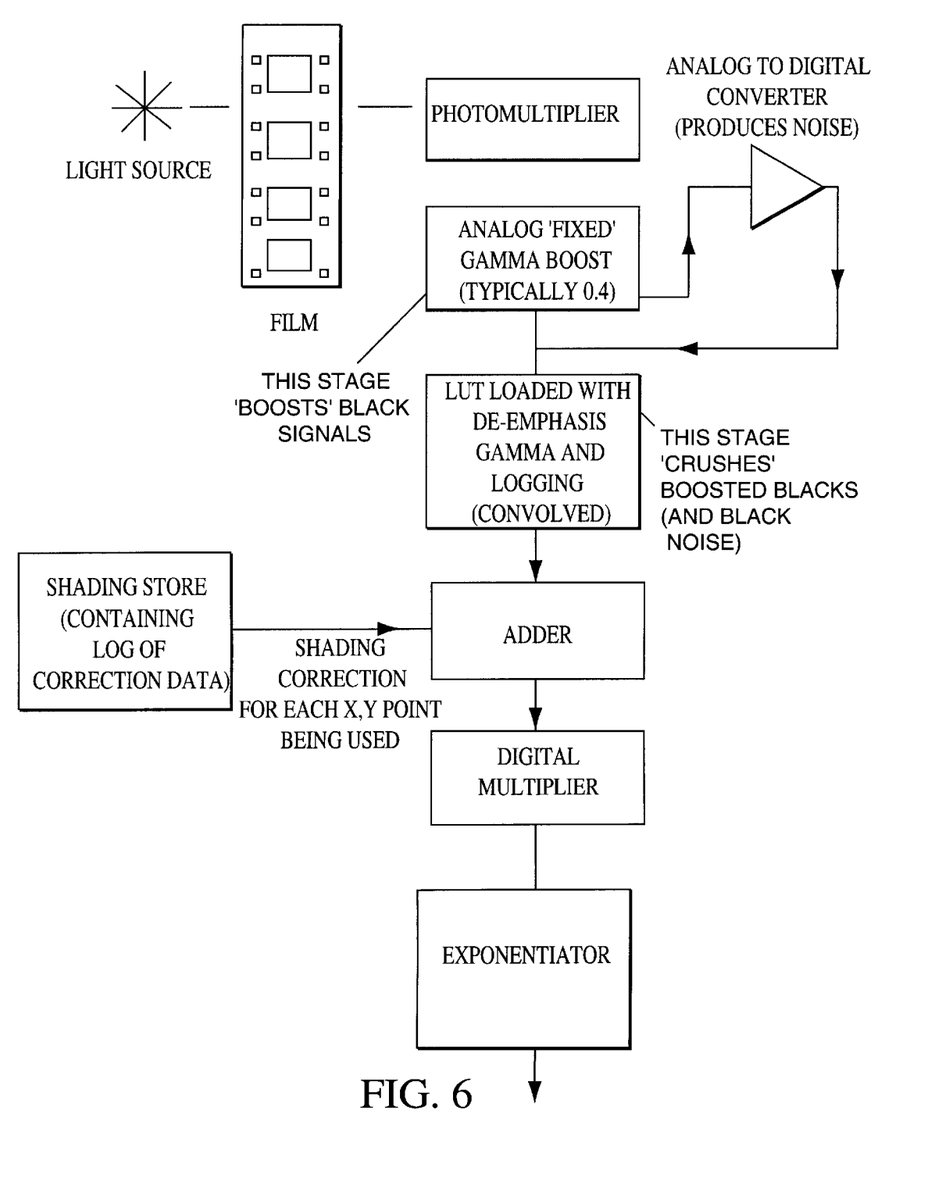
FIG. 6 is a schematic representation of yet a further embodiment of the invention wherein the digital signal is subjected to shading correction.

Telecine systems, such as the Rank Cintel URSA, contain a technique to digitally correct for shading errors. Shading errors result from amongst other things, non-uniform illumination. Such shading errors are corrected by a 2-dimensional correction map. For a given picture point with address x,y the shading store has a weighting factor. This is essentially a multiplicative value, for which the video signal is multiplied. Such shading correction can be performed in a logarithmic domain, by adding the logarithm of the shading correction to the logarithm of the video signal. This gives the logarithm of the corrected video signal. This is shown in the embodiment of FIG. 6.

Figure 7:
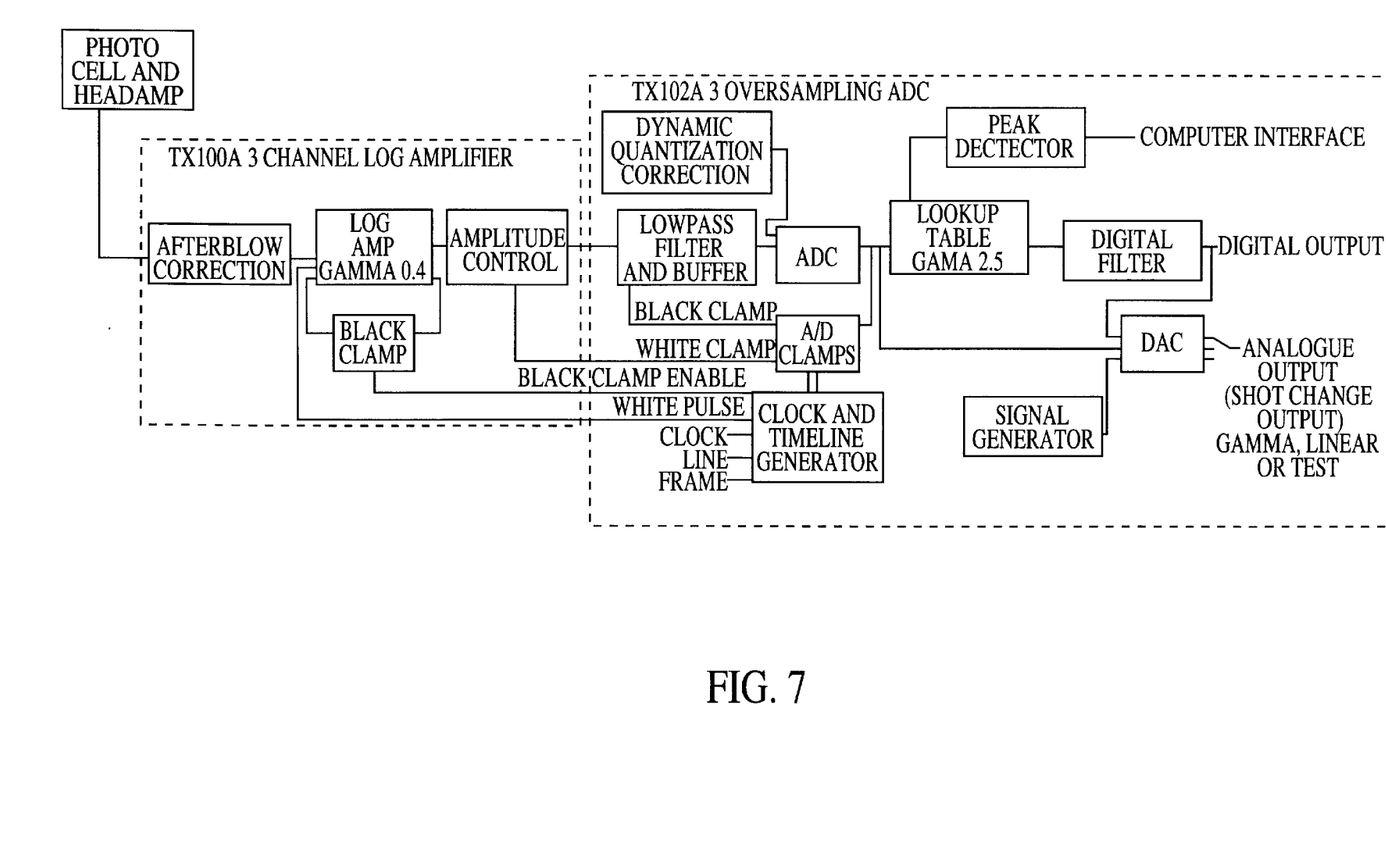
FIG. 7 is a block circuit diagram of a particularly preferred embodiment of the present invention.
Figure 8:
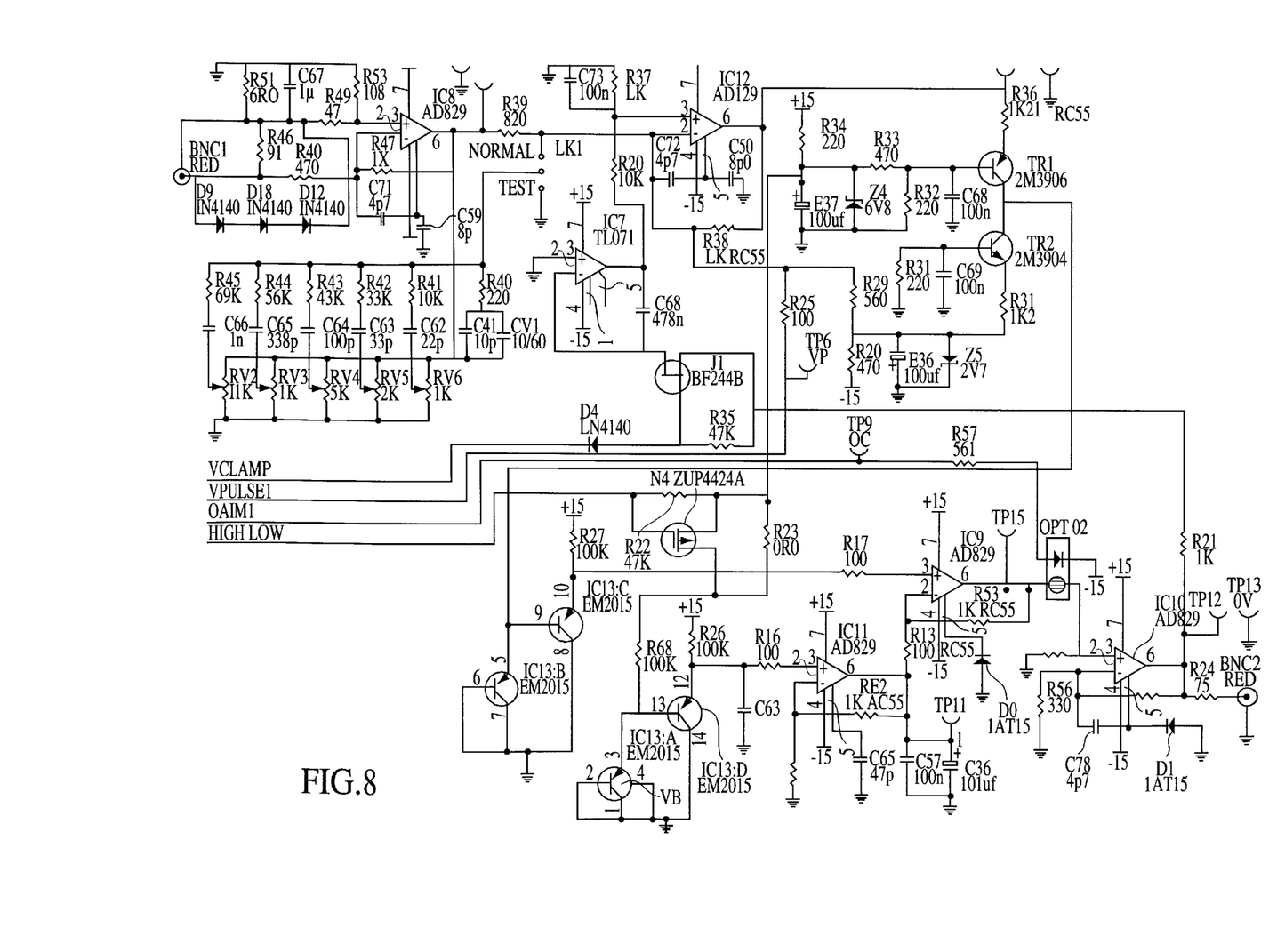
FIG. 8 is a circuit diagram of the analogue stage of the embodiment of FIG. 7.
Figure 9:
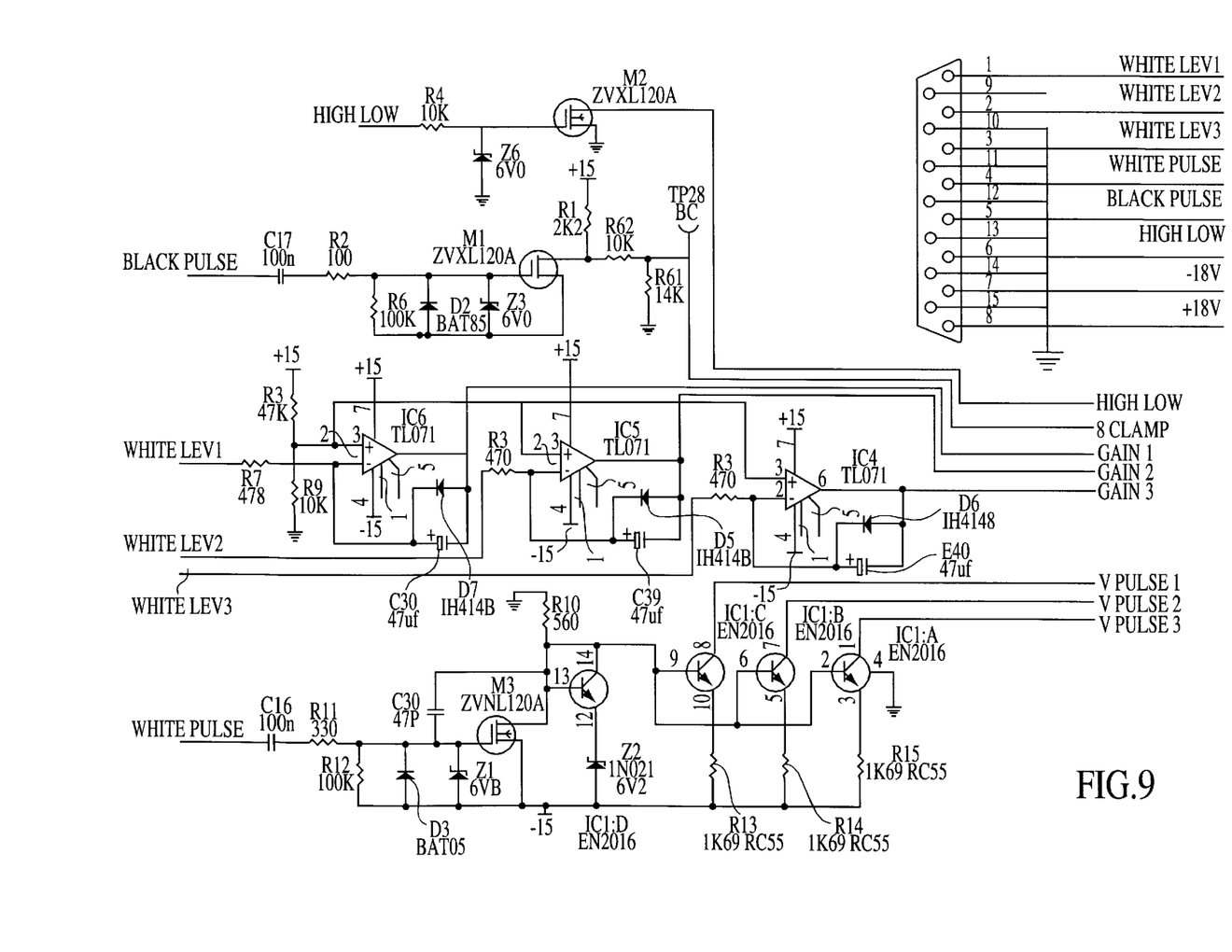
FIG. 9 is a circuit diagram of a further part of the analogue stage of the embodiment of FIG. 7.

FIGS. 7 to 9 show a particularly preferred embodiment of the invention. As shown in FIG. 7, this embodiment comprises an analogue 3-channel logarithmic amplifier and an oversampling A/D convertor. The logarithmic amplifier is situated in the back of the telecine close to the photo-electric cell head amplifiers to minimise noise pickup in the cables between the head amplifiers and this unit. The cables between this unit and the A to D converters are far less critical in terms of noise and so can be longer because they carry gamma corrected signals.

The three channels of the amplifier correspond to the red, green and blue of a standard RGB signal. However, for simplicity, only the operation of the red channel will be described herein, the other channels being correspondingly arranged.

Referring to FIG. 8, the red input from the telecine head is provided with three input clip diodes, D9, D18 and D12. The purpose of these diodes is to prevent overload signals from driving the following circuitry into clip. When amplifiers go into hard clip they inevitably take time to recover and this would cause lag-type effects in the picture.

Afterglow correction has to be undertaken before the gamma correction and so has to be sited in the front end gamma corrector. The input signal is amplified by a very low noise amplifier IC8 and is applied to the afterglow correction network consisting of adjustments RV2,3,4,5,6,CV1 and associated components. Op-amp IC12 combines the video signal via resistor R39 with the afterglow signal via connection LK1, the white reference pulse via resistor R25 and DC offset via resistor R29 all on its virtual earth input. Black clamp is applied to the non-inverting input of op-amp IC12 via filter network R20, R37, C73 ensuring that noise from the relatively noisy black clamp op-amp IC7 does not find its way onto the video path.

Transistor arrangement IC13:B is the non-linear element of the system and operates on the principle that the base-emitter voltage of a transistor is proportional to the logarithm of the collector current. Transistor TR1 converts the video signal into a current to apply to the logarithmic element IC13:B. Transistor TR2 biases TR1. Transistor IC13:A is an identical logarithmic element but is fed only a black reference current from resistor R60. It will be seen later that the black clamp action will set the black current in transistor IC13:B to exactly the same current as in transistor IC13:A. Transistors IC13:C and IC13:D buffer the signal and the black reference voltage from transistors IC13:B and IC13:A respectively.

Op-amps IC9 and IC11 form a very low noise differential amplifier with a gain of 11. Since the signal from the black reference element is DC only, all AC signal components are shorted to ground by capacitors C57 and E35. This stops transistors IC13:A:D and amplifier IC11 from contributing any noise to the video signal. Op-amp IC11 is compensated for capacitive load by capacitor C55. The output of the differential amplifier is passed via gain element OPTO1 to output amplifier IC10.

The output of amplifier IC10 is compared with ground during line blanking by op-amp IC7 and FET switch J1. If there is any discrepancy, component IC7 will apply a correcting DC offset to op-amp IC12 pin 3. This in turn will change the black level current in transistor TR1, and hence the black level current in the logarithmic element IC13:B. For the output of amplifier IC10 to be at ground potential the voltage on the emitter of transistor IC13:B, the real logarithmic element, must be equal to the voltage on the emitter of IC13:A, the reference logarithmic element. It follows that the currents must be the same in each element for the voltages to be the same and therefore the black level current in the real logarithmic element, IC13:B, must be equal to the current in resistor R60. Resistor R60 therefore sets the minimum current in the logarithmic element and therefore sets the range of the logging stage and hence the amount the black signals are amplified.

Because the output voltage from the logarithmic stage is temperature dependant a gain clamp is required. For this reason, a white reference pulse is injected during line blanking by transistor arrangement IC1, via op-amp IC12 and transistor TR1 (see FIGS. 8 and 9). Great care has been taken to ensure that the white reference pulse in terms of current in the log element is not only accurate, but perfectly matched between the three colours, as the accuracy and linearity of the system ultimately depends on the gain clamp. The white pulse measurement is done digitially after the A to D conversion to ensure gain errors in the A to D converters are also clamped out. Feedback comes up the connecting ribbon cable PL1 and is amplified and filtered by op-amp IC6 to drive the illuminating LED in the gain control device, OPTO1.

The A to D converters are of the over sampling type because when the gamma correction applied in the previously described section is undone in the digital domain, harmonics are generated that need to filtered out. Oversampling provides the spectral headroom necessary for these harmonies to be described fully within the Nyquist bandwidth. The harmonics generated are predominantly second harmonics.

Input signals from the gamma amplifier are bandwidth limited by an anti-alias low-pass filter, and associated components, and fed to an input amplifier which in association with other buffering components provides a signal for A to D conversion. The A/D conversion stage actually comprises two A/D convertors one of which is provided with an inverted signal. The converters are both clocked synchronously at 36 MHz. The inverted signal to the second A to D converter is delayed by approximately half a clock, making the effective sample rate 72 MHz. References for the A to D's are generated by a separate integrated circuit.

An integrated circuit subtracts the output from the A/Ds to obtain an 11 bit signal at 36 MHz sample rate. This is buffered by two ICs and fed to two PROM's. These PROM's contain a look-up table which is the precise inverse of the function performed by the analogue gamma amplifier. The preferred value of gamma in the analogue stage is 0.4 and thus in the digital stage the inverse value is 2.5. The output of the subtractor is monitored to provide the black clamp and white clamp, (DC & gain) necessary to ensure accuracy and linearity of the system. The output of the PROM's is fed to two programmable digital filters which together with a digital adder, form a halfband, decimate by two filter. Coefficients are loaded into the filter chips by a stand alone microprocessor. This filter blocks the harmonics generated by the non-linear look-up table that would otherwise alias back down into the 8 MHz signal bandwidth when the samples are decimated to 18 MHz sampling frequency.

The output of the adder is clipped for underflow and overflow. The output is buffered and sent to a PCB edge connector.

Other integrated circuits may be provided for test purposes. Test signals are loaded-to a PROM. A triple 8-bit D to A is provided whose inputs are fed with digital video from two different points in the signal chain, and the test video from the PROM. These signals can be output selectively by means of a selector-switch. There is also provided a peak detector and CPU interface which is used for automatic sensitivity alignment of the photomultiplier cells.

What we claim is:

1. A process for applying a characteristic adjustment to signals obtained from an image, the process comprising the steps of:
    producing an analogue signal representative of the image;
    applying to the analogue signal a pre-emphasis;
    converting the analogue signal to a digital signal;
    subjecting the digital signal to a de-emphasis, to remove the effect of the pre-emphasis;
    calibrating by utilizing feedback between the pre-emphasis and the de-emphasis; and
    simultaneously or subsequently providing the digital signal with a desired characteristic adjustment.

2. The process of claim 1 wherein the pre-emphasis step is a transformation of the analogue signal which accentuates the levels of the signal corresponding to the dark regions of the image.

3. The process of claim 2 wherein the pre-emphasis step is a gamma adjustment.

4. The process of claim 1 wherein the calibration is achieved by reference to a test frame.

5. The process of claim 1 wherein the calibration is achieved by reference to a light source of known level.

6. The process of claim 1 wherein the calibration is achieved by reference to a fixed analogue signal corresponding to a predetermined light level.

7. The process of claim 1 wherein the calibration step comprises the additional steps of converting an analogue test signal to a low-noise digital signal and calibrating with reference to the low-noise digital signal.

8. The process of claim 1 wherein the calibration step adjusts the de-emphasis.

9. The process of claim 1 wherein the calibration step adjusts the pre-emphasis.

10. The process of claim 1 wherein the adjustment is representative of a gamma adjustment.

11. The process of claim 1 wherein the steps of producing the analogue signal comprises scanning cinematographic film to generate the analogue signal, which is representative of an image stored on the film.

12. Apparatus for applying a characteristic adjustment to signals obtained from an image, the apparatus comprising:

means for producing an analogue signal representative of the image;

means for applying to the analogue signal a pre-emphasis;

means for converting the analogue signal to a digital signal;

means for subjecting the digital signal to a de-emphasis, to remove the effect of the pre-emphasis;

means for simultaneously or subsequently providing the digital signal with a desired characteristic adjustment; and means for calibrating by utilizing feedback between the pre-emphasis and the de-emphasis.

13. The apparatus of claim 12 wherein the means for applying a pre-emphasis includes transforming the analogue signal, which accentuates the levels of the signal corresponding to the dark regions of the image.

14. The apparatus of claim 13 wherein the means for applying a pre-emphasis includes performing a gamma adjustment.

15. The apparatus of claim 12 wherein the means for calibrating includes calibrating by reference to a test frame.

16. The apparatus of claim 12 wherein the means for calibrating includes calibrating by reference to a light source of known level.

17. The apparatus of claim 12 wherein the means for calibrating includes calibrating by reference to a fixed analogue signal corresponding to a predetermined light level.

18. The apparatus of claim 12 wherein the means for calibrating includes converting an analogue test signal to a low-noise digital signal and calibrating with reference to the low-noise digital signal.

19. The apparatus of claim 12 wherein the means for calibrating includes adjusting the de-emphasis.

20. The apparatus of claim 12 wherein the means for calibrating includes adjusting the pre-emphasis.

21. The apparatus of claim 12 wherein the means for simultaneously or subsequently providing the digital signal with a desired characteristic adjustment includes a gamma adjustment.

22. The apparatus of claim 12 wherein the means for producing the analogue signal includes means for scanning cinematographic film to generate the analogue signal, which is representative of an image stored on film.

* * * * *